UNITED STATES PATENT OFFICE.

THEODORE OSCAR PAUSE, OF ATLANTA, GEORGIA, ASSIGNOR OF ONE-HALF TO JOHN S. CLARKE, OF ATLANTA, GEORGIA.

COMPOSITION OF MATTER.

SPECIFICATION forming part of Letters Patent No. 703,151, dated June 24, 1902.

Application filed March 22, 1901. Serial No. 52,405. (No specimens.)

*To all whom it may concern:*

Be it known that I, THEODORE OSCAR PAUSE, a citizen of the United States, residing at Atlanta, in the county of Fulton and State of Georgia, have invented a new and useful Composition of Matter, of which the following is a specification.

This invention relates to compositions of matter, and has for its object to provide an improved composition which is originally plastic, so that it may be molded into various shapes and also applied in comparatively thin layers to produce a finished surface to a backing of suitable character, the finished article being fireproof and also waterproof, and therefore particularly adapted for use in the structure of buildings to form columns or pillars, ornamental work, floors, walls, and ceilings and the like.

In carrying out the present invention there is first provided a body or base consisting of one element or a combination of elements, each of which is in the nature of a powder—as, for instance, sawdust, sand, or slate-dust. Also cotton may be used alone or in combination with one or more of the first-mentioned elements. With such a base there is combined calcined magnesite, and this dry composition is rendered plastic by means of water in which has been dissolved chlorid or sulfid of magnesium, after which the plastic material may be molded or fashioned into any desired shape—as, for instance, into ornamental work for ceilings and the like and into columns for building structures—the completed article being exceedingly strong and durable.

As hereinbefore indicated, it is designed to employ the present invention as a flooring material, especially in imitation of parquet flooring, and in carrying out this feature of the invention there are employed three strips, sheets, or layers of burlap, which are painted or saturated with a water solution of magnesite and a salt of magnesium, either sulfid or chlorid, and silica or whiting, whereby the burlap is rendered fireproof, and a strong cement-like bond is formed between the layers of burlap, so as to provide a strong and durable back or base. In my experiments I have demonstrated the best results are had with three layers of burlap; also, that burlap is the only material that can be effectually used to form a strong, durable, and light backing which will not curl up, warp, or crack under the effects of wear and dampness. After the backing has thus been prepared the upper face thereof or face to be exposed as the floor-surface is covered with a thin coat or layer of the plastic material hereinbefore described, the thickness of the layer being about one-sixteenth of an inch. To secure comparative lightness without sacrificing strength, it is preferred to use sawdust as a base for the flooring material, small quantities of boracic acid and sal-ammoniac being added to increase the hardness of the completed article, although such additional elements are not absolutely necessary. By adding silica or sand the material may be strengthened and rendered capable of taking a more highly-polished surface. Just before the plastic material becomes dry and may yet take an impression the upper exposed surface thereof is exposed to a die, preferably formed of metal and in any desired shape or arrangement of blocks, so as to give to the completed article the grained appearance of wood, after which the grained surface is painted with a soap solution of one-fifth soap and four-fifths water, and when the composition has become thoroughly dry the surface is polished in the common or ordinary manner of polishing a wooden parquet floor. The magnesium chlorid and magnesite attack the soap and harden the same, thereby rendering it insoluble in water or waterproof and capable of taking a high polish. In laying this floor material the back thereof is painted with a solution of whiting, magnesite, and chlorid or sulfid of magnesium, and while still wet the treated back is pressed firmly to the underneath flooring, whereby the solution will act in the capacity of a cement and secure the blocks or strips of material firmly in place without the employment of nails or additional fastenings. As dampness or change of temperature has no effect upon the completed article there will be no warping nor loosening of the flooring. It will be understood that the surface of the flooring is to be filled with any desired color of filler, as in wooden floors, the filler being applied after the application of the soap solution, and when dry a second application of the soap solution is made, the surface formed by the latter being the part that is polished.

Although it is preferred to use the specially-prepared backing in floors and similar places where the material is subjected to constant wear and hard usage, it is not absolutely necessary to employ a backing when the material is used upon walls and for ornamental work.

An imitation-marble surface may be provided by using the hereinbefore-described plastic material with sawdust, cotton, sand, or whiting as the base, the surface thereof being painted or treated with the soap solution and finally polished, any desired coloring material being added to the surface to give a surface coloring. The function of the cotton is to give the peculiar grained, mottled, and transparent appearance peculiar to highly-polished marble surfaces and also to produce a strong, durable, and light material that will not crack and is rendered impervious to water. It is also designed to provide a blackboard-surface by the employment of a burlap backing, as hereinbefore described, and applying to the same a layer of plastic material, formed of whiting, magnesium chlorid, and magnesite, and a thin surface layer of powdered slate, magnesite, and magnesium chlorid, together with suitable coloring material to give the finished surface the desired black color, said surface being capable of receiving a mark from crayon by reason of the powdered slate. Also silica may be added to the outer layer, so as to give hardness thereto, as hereinbefore explained.

Roofing-tiles and the like may be made in the same manner as described for the blackboard, with the addition of the soap solution to the layers of burlap and a coat of tar or pitch between the layers, so as to render the same waterproof, and thereby prevent leaking should the outer surface become cracked. Also for flat roofs a sheet of burlap treated to the soap solution may be stretched across the roof and provided with a top surface of sand, magnesite, and magnesium chlorid, said surface being finally sized with the soap solution.

In producing columns, ornamental work, and the like the base is preferably sawdust, so as to be light, the magnesium chlorid dissolved in water, and the calcined magnesite being combined therewith to form a plastic material which is designed to be pressed or poured into a mold, so as to take on the desired shape when hardened. Before placing the material in the mold the interior of the latter is first oiled and then painted with a mixture of whiting or silica, magnesite, and magnesium chlorid, the latter mixture giving a white surface to the completed article and the oil insuring the easy withdrawal of the article without sticking to the mold. After the article has become hard and removed from the mold it is given a coat of the soap solution, which combines with the magnesite and magnesium chlorid, so as to give the article a waterproof surface.

From the foregoing description it will be apparent that the present invention consists, essentially, in producing a basic compound which may be modified for a variety of uses, the basic compound consisting, essentially, of magnesite, magnesium chlorid, and a base or vehicle for containing and holding the two former elements, the compound being originally of a plastic nature—as, for instance, like ordinary mortar—so that it may be conveniently molded and otherwise applied for the purposes and in the manner hereinbefore set forth.

What is claimed is—

1. As a new article of manufacture, a plurality of layers or sheets of burlap, which have been treated to a solution of magnesium chlorid, magnesite, and a mineral powder, a plastic compound applied to the backing and consisting of magnesium chlorid, magnesite, and a mineral powder, and a final surfacing compound applied to the plastic compound.

2. As a new article of manufacture, a plurality of layers or sheets of burlap, which have been treated to a solution of magnesite, an alkaline salt of magnesium, and a mineral powder, a surfacing compound applied thereto, and a sizing solution applied to the surfacing compound and capable of taking a high polish.

3. As a new article of manufacture, a plurality of layers or sheets of burlap, which have been treated to a solution of magnesite, a salt of magnesium, and a mineral powder, a surfacing compound applied thereto, and a sizing soap solution applied to the compound.

4. A new article of manufacture, consisting of a backing, a plastic surfacing material applied thereto, a sizing applied to the surface after it has become dry, a filler applied to the surface after the sizing, and a final sizing applied to the filled surface, the latter sizing being polished.

5. A new article of manufacture, consisting of a plurality of sheets of burlap, which have been subjected to a solution of magnesite, magnesium chlorid, and whiting, a surfacing compound applied thereto and consisting of magnesium chlorid, magnesite, sawdust, and silica, a soap solution applied to the surface, a filler applied after the soap solution, and a sizing of soap solution after the filler, the latter soap sizing being polished.

6. As a new article of manufacture, a backing treated with a compound of magnesite, a salt of magnesium, and a mineral powder and provided with a surface coating.

7. As a new article of manufacture, a flexible, porous backing treated with a compound of magnesite, a salt of magnesium and a mineral powder and provided with a surface coating.

In testimony that I claim the foregoing as my own I have hereto affixed my signature in the presence of two witnesses.

THEODORE OSCAR PAUSE.

Witnesses:
DAVID N. FREEMAN,
REUBEN R. ARNOLD.